United States Patent [19]

Nishii et al.

[11] Patent Number: 5,763,340
[45] Date of Patent: Jun. 9, 1998

[54] METHOD FOR PRODUCTION OF $SiO_2$ GLASS MATERIAL HAVING REGIONS CHANGED IN LIGHT REFRACTIVE INDEX AND $SiO_2$ GLASS MATERIAL PRODUCED BY THE METHOD

[75] Inventors: Junji Nishii, Kawanishi; Kohei Fukumi; Akiyoshi Chayahara, both of Ikeda; Kanenaga Fujii, Hyogo-ken; Hiroshi Yamanaka, Nara-ken, all of Japan

[73] Assignee: Agency of Industrial Science & Technology, Ministry of International Trade & Industry, Tokyo, Japan

[21] Appl. No.: 783,041

[22] Filed: Jan. 14, 1997

[30] Foreign Application Priority Data

Jan. 19, 1996 [JP] Japan ............................ 8-025754

[51] Int. Cl.⁶ .................................................. C03C 13/04
[52] U.S. Cl. ............................ 501/36; 501/54; 65/385; 65/392; 65/394
[58] Field of Search ......................... 501/37, 54; 65/385, 65/392, 394

[56] References Cited

U.S. PATENT DOCUMENTS

| | | | |
|---|---|---|---|
| 4,474,427 | 10/1984 | Hill et al. | 350/96.3 |
| 5,104,209 | 4/1992 | Hill et al. | 385/27 |
| 5,235,659 | 8/1993 | Atkins et al. | 385/124 |
| 5,478,371 | 12/1995 | Lemaire et al. | 65/384 |
| 5,500,031 | 3/1996 | Atkins et al. | 65/386 |

OTHER PUBLICATIONS

K. O. Hill, et al., "Photosensitivity in Optical Fiber Waveguides: Application to Reflection Filter Fabrication", Appl. Phys. Lett., vol. 32, No. 10 (1978), pp. 647–649.

Kelly D. Simmons, et al., "Photosensitivity of Solgel–Derived Germanosilicate Planar Waveguides", Optics Letter, vol. 18, No. 1, (1993), pp. 25–27.

*Primary Examiner*—Karl Group
*Attorney, Agent, or Firm*—Oblon, Spivak, McClelland, Maier & Neustadt, P.C.

[57] ABSTRACT

A method for producing a $SiO_2$ glass material having regions changed in light refractive index is provided which comprises implanting at least $5 \times 10^{19}$ Ge ions/cm³ into a $SiO_2$ glass substrate, heat-treating the substrate at a temperature exceeding 300° C., and exposing the substrate to an ultraviolet light. Also provided is a $SiO_2$ glass material produced by the method.

9 Claims, 5 Drawing Sheets

(a)

(b)

METHOD FOR PRODUCTION OF SiO₂ GLASS MATERIAL HAVING REGIONS CHANGED IN LIGHT REFRACTIVE INDEX AND SiO₂ GLASS MATERIAL PRODUCED BY THE METHOD

BACKGROUND OF THE INVENTION

1. Field of the Invention

This invention relates to a method for the production of a $SiO_2$ glass material having regions changed in light refractive index and a $SiO_2$ glass material produced by the method.

2. Description of the Prior Art

It is known that a Ge-doped $SiO_2$ glass experiences an increase in refractive index when irradiated with an ultraviolet laser beam. The feasibility of utilizing this phenomenon in a fiber diffraction grating, for example, has been under study (K. O. Hill et al., Appl. Phys. Lett., 32 (1978) 647). The same phenomenon has also been observed in thin glass film produced by the sol-gel method (K. D. Simmons et al, Opt. Lett., 18 (1993), 25) and is used for forming diffraction gratings by the prism method. By this method, however, it is difficult to obtain a waveguide structure of the type envisioned for use in the communications field, for example, or to achieve fine adjustment of film thickness.

Therefore it is strongly desired to develop a $SiO_2$ glass material having regions changed in light refractive index so as to enable easy formation of such a waveguide structure.

SUMMARY OF THE INVENTION

Through a study conducted in the light of the circumstances mentioned above, the inventors learned that the desired $SiO_2$ glass material can be obtained by implanting at least $5\times10^{19}$ Ge ions/cm³ into a $SiO_2$ glass substrate by the ion implantation technique, heat-treating the substrate to a temperature exceeding 300° C., and exposing the substrate to an ultraviolet light. This invention has been accomplished as a result.

Specifically, this invention is directed to a method for the production of a $SiO_2$ glass material having regions changed in light refractive index which consists essentially of implanting at least $5\times10^{19}$ Ge ions/cm³ into a $SiO_2$ glass substrate by the ion implantation technique, heat-treating the Ge ion-implanted $SiO_2$ substrate at a temperature of at least 300° C., and exposing the heat-treated substrate to an ultraviolet light and to a $SiO_2$ glass material having regions changed in light refractive index at a depth of about 1 to 2 μm from the surface of the substrate, obtained by a method which consists essentially of implanting at least $5\times10^{19}$ Ge ions/cm³ into a $SiO_2$ glass substrate by the ion implantation technique, heat-treating the Ge ion-implanted $SiO_2$ substrate at a temperature of at least 300° C., and exposing the heat-treated substrate to an ultraviolet light.

DESCRIPTION OF THE PREFERRED EMBODIMENT

Figure 1:
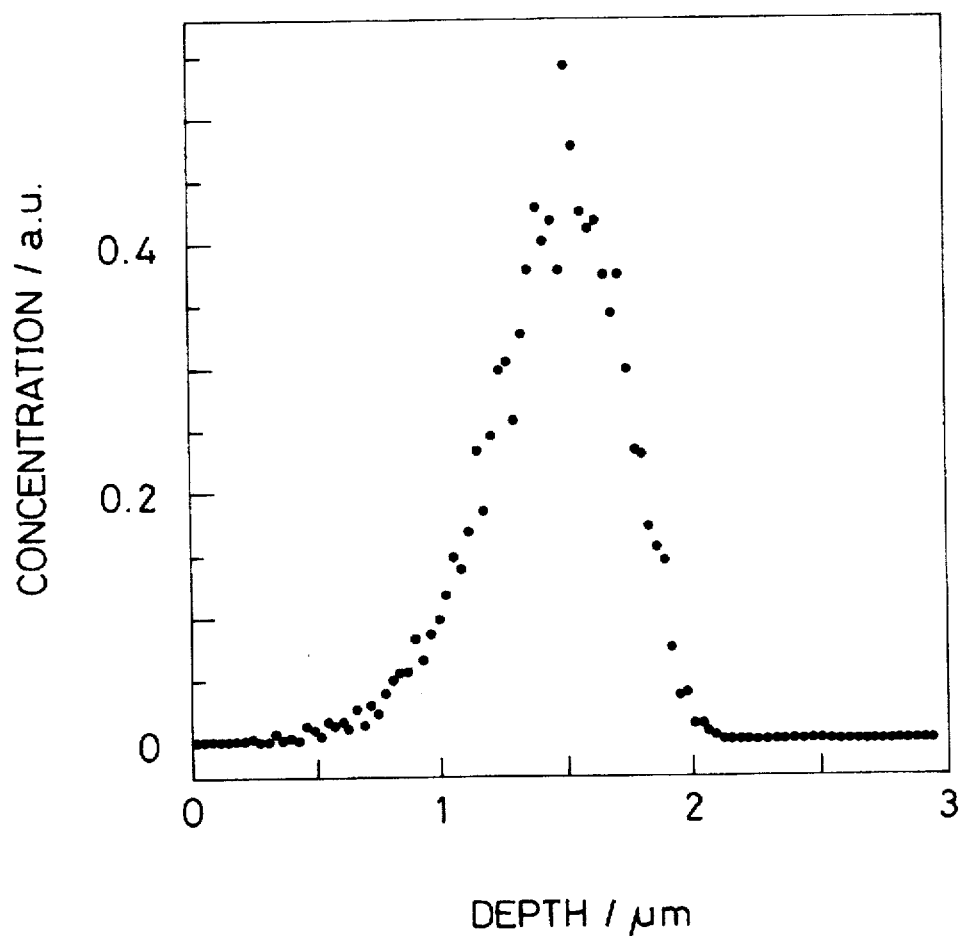
FIG. 1 is a graph showing the concentration of Ge ions in a $SiO_2$ glass substrate into which Ge ions were implanted as described in Example 1.

The Ge-doped $SiO_2$ glass is produced by implanting Ge ions into a $SiO_2$ glass substrate by an ion implantation technique. Insofar as the ion implantation technique used is capable of ionizing Ge, accelerating the produced Ge ions, and implanting the Ge ions into a $SiO_2$ glass as a substrate, it is not particularly limited as regards kind of device, the implantation conditions (such as acceleration voltage and degree of vacuum), etc.

The light-induced refractive index of the $SiO_2$ glass which is consequently produced is related to a change in structure of the glass in the proximity of the implanted Ge ions. This is evidenced by the fact that the regions which change in refractive index coincide with the region implanted with the ions.

To enable the refractive index of the Ge-doped $SiO_2$ glass to change only in the regions implanted with ions, the glass after the implantation of Ge ions must be heat-treated and then exposed to an ultraviolet light. If the glass is exposed to the ultraviolet light without being heat-treated, the light containing effect required for formation of a waveguide path is not obtained because the refractive index decreases not only in the implantation layer but also in the layer between the implantation layer and the surface of the substrate (hereinafter referred to as the "damaged layer").

The amount of Ge ions implanted is generally at least $5\times10^{19}$ ions/cm³, preferably at least $1\times10^{20}$ ions/cm³. If the amount of Ge ions implanted is unduly small, the light-induced phenomena related to the presence of Ge, such as the change in substrate density due to structural changes in the proximity of the Ge ions and the formation of a new absorption band, are not obtained.

As a result, the effect of obtaining a light-induced change in refractive index only in the Ge implantation layer is not achieved. The largest allowable amount of implanted Ge ions is in the neighborhood of $1\times10^{21}$ ions/cm³. The reason for this upper limit is that when the amount of Ge ions implanted exceeds the upper limit, the adjacent Ge ions become too closely spaced, possibly to the point where they form Ge metal colloids and cease to respond to light completely. The temperature at which the ion-implanted substrate is heat-treated is generally in the range of 300° to 1000° C. If this temperature fails to reach 300° C., the increase in the refractive index only in the implantation layer cannot be achieved. If the temperature exceeds 1000° C., the implanted Ge ions may volatilize from the glass and response to light will cease to occur. Thus, the desired ultraviolet light-induced change in the refractive index only in the implantation layer cannot be obtained if the temperature of the heat treatment deviates from the range specified above. The time of this heat treatment generally is at least three hours. If the time of the heat treatment is unduly short, a waveguide path is not formed because the refractive index changes also in the damaged layer. Generally, the time of the heat treatment may be short if the temperature of the heat treatment is high. The heat treatment time increases with decreasing heat treatment temperature.

The ultraviolet light to which the ion-implanted substrate is exposed after the heat treatment is preferably an ultraviolet laser beam of a wavelength of not greater than 300 nm. The energy density of this laser beam must be at least 5 mJ/cm$^2$ and is preferably in the approximate range of 10 to 200 mJ/cm$^2$. Concrete examples of the ultraviolet light source which can be advantageously used herein include KrF and ArF excimer laser beams and a quadrupled Nd-YAG laser beam. If the laser beam used has unduly low energy density, it will be difficult to secure an ultraviolet light-induced change in refractive index of the level required for the formation of a waveguide path, specifically a change of at least 1×10$^{-3}$. Conversely, if the laser beam has an unduly high energy density, the glass surface will be damaged.

The SiO$_2$ glass material produced by the method of this invention has regions changed in light refractive index. These regions exist at a depth in the approximate range of 1 to 2 μm from the surface of the substrate.

The SiO$_2$ glass material produced by the method of this invention is suitable for the formation of a waveguide path.

This invention will now be described more specifically below with reference to working examples and comparative examples.

Figure 3:
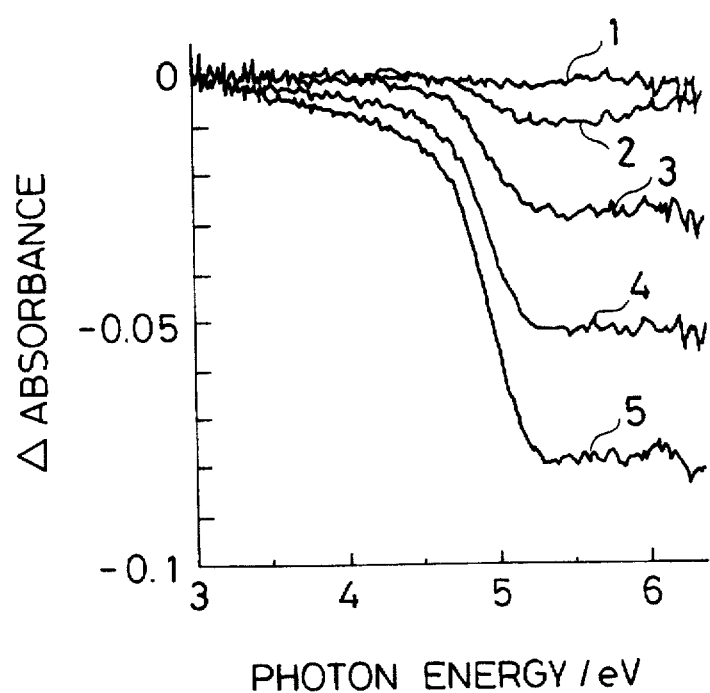
FIG. 3 is a graph showing changes in the absorbance spectrum of a material of this invention obtained in Example 1 after the material was etched with an aqueous 1% HF solution.

The material of this invention obtained as described above was etched with 1% HF solution at intervals of a fixed length. The etching thickness successively grew to 0.7 μm, 1.3 μm, 1.45 μm, 1.55 μm, and 2.0 μm. After each step of etching, the material was tested for change in light absorption spectrum. The results are shown in FIG. 3. In FIG. 3, the curves 1, 2, 3, 4, and 5 represent the amounts of change in absorbance determined in the successive steps of etching.

FIG. 3 shows that the ultraviolet light-induced changes in the absorption intensity occurred in regions 1 to 2 μm from the surface of the material and that these regions coincided with the regions of Ge implantation. The data indicate that the regions undergoing the ultraviolet light-induced change in refractive index occurred solely in the layer of Ge ion implantation.

EXAMPLES 2 TO 5

SiO$_2$ glass substrates of the same material as in Example 1 were subjected to ion implantation, heat treatment, and exposure to ultraviolet light under the conditions shown in Table 1 by following the procedure of Example 1. The results are also shown in Table 1. It will be noted from the table that in all the examples, positive change in refractive index was found exclusively in the ion implantation layer.

TABLE 1

| Example | Acceleration voltage (MeV) | Amount of ions implanted (ions/cm$^3$) | Temperature/time of heat treatment (°C./hr) | Amount of change in refractive index |
| --- | --- | --- | --- | --- |
| 1 | 2 | 2 × 10$^{20}$ | 500/15 | 1 × 10$^{-3}$ |
| 2 | 3 | 3 × 10$^{20}$ | 800/5 | 2 × 10$^{-3}$ |
| 3 | 1.5 | 3 × 10$^{20}$ | 350/10 | 1 × 10$^{-3}$ |
| 4 | 2 | 2 × 10$^{20}$ | 950/3 | 1 × 10$^{-3}$ |
| 5 | 3 | 3 × 10$^{20}$ | 450/20 | 2 × 10$^{-3}$ |

EXAMPLE 1

In a vacuum (10$^{-6}$ Torr), Ge ions were implanted at an acceleration voltage of 2 MeV into a SiO$_2$ glass substrate, 2 mm in thickness, 2 cm in length, and 2 cm in width, in a concentration of 1×10$^{19}$ ions/cm$^3$. The glass substrate was tested for Ge concentration distribution by a TRIM cord. The results are shown in FIG. 1. FIG. 1 shows that the Ge ions were distributed in regions 1 to 2 μm from the surface of the substrate. The average Ge concentration in the areas was 2×10$^{20}$ ions/cm$^3$.

Figure 2:
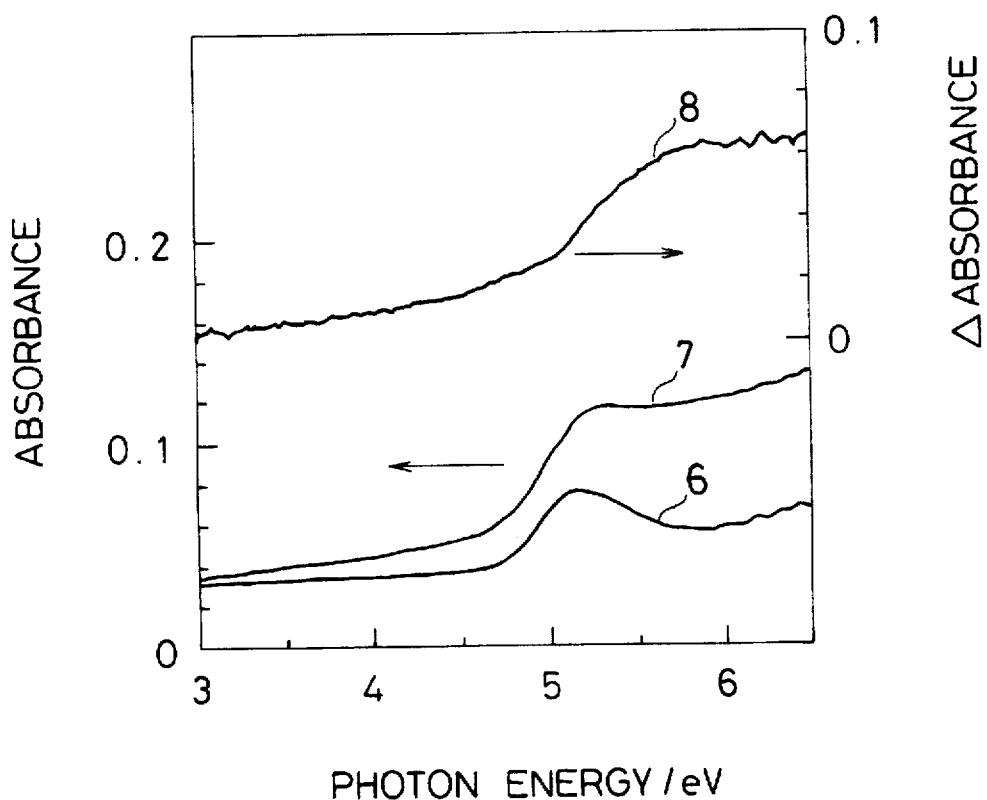
FIG. 2 is a graph showing changes in substrate absorbance spectrum before and after exposure to an ArF laser beam in Example 1.

The glass material consequently obtained was heat-treated at 500° C. for 15 hours and then exposed to 10$^4$ pulses of an ArF laser beam (193 nm) having a power density of 30 mJ/cm$^2$. The substrate was tested for change in light absorbance spectrum before and after the exposure to the ArF laser beam. The results are shown in FIG. 2. In this graph, the curve 6 represents the absorbance prior to the exposure, the curve 7 the absorbance after the exposure, and the curve 8 the difference between the two absorbances.

It can be noted from FIG. 2 that an additional absorption was induced in the region having a photon energy of 3 MeV and greater. When the amount of change in the refractive index brought about by this absorption was estimated in accordance with Kramers-Kronig's theorem, it was found to be +10$^{-3}$.

COMPARATIVE EXAMPLE 1

Figure 4:
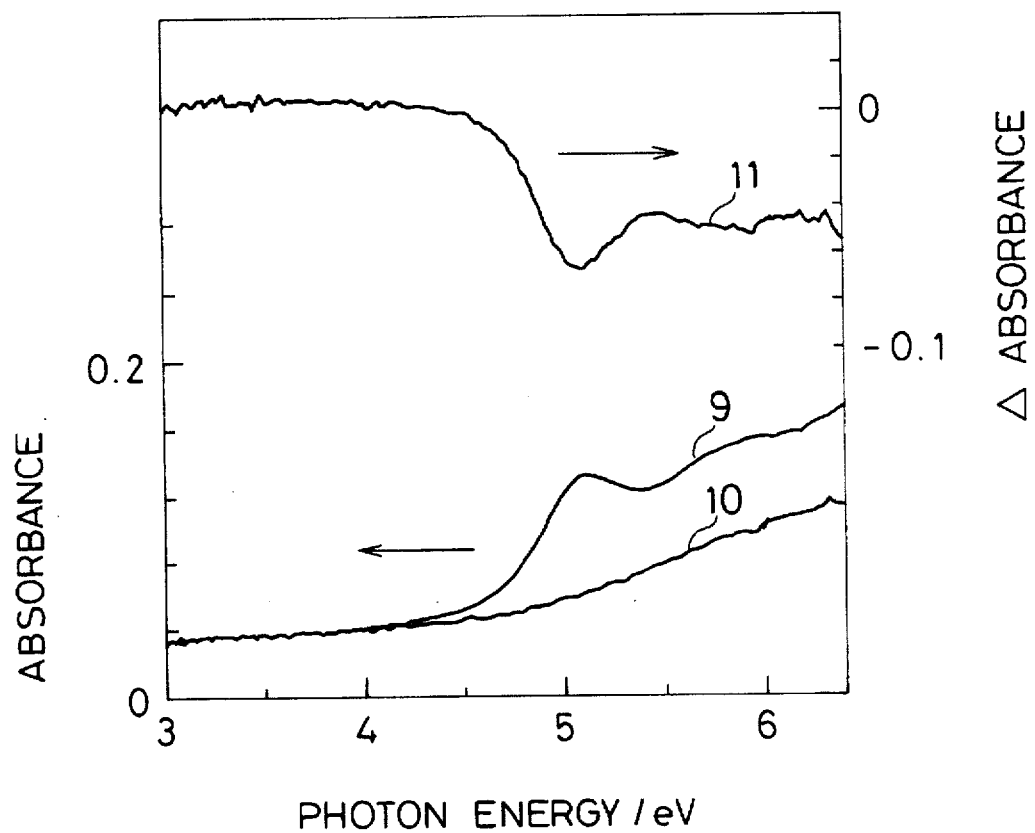
FIG. 4 is a graph showing changes in the absorbance spectrum of a substrate before and after exposure to an ArF laser beam in Comparative Example 1.

A SiO$_2$ glass material was treated by following the procedure of Example 1 while omitting the step of heat treatment. The substrate was tested for change in light absorption spectrum before and after the exposure to an ArF laser beam. The results are shown in FIG. 4. In FIG. 4, the curve 9 represents the absorbance before the exposure, the curve 10 the absorbance after the exposure, and the curve 11 the difference between the two absorbances. It is apparent from FIG. 4 that the absorption bands induced by irradation implantation was bleached monotonously by the UV irradiation.

The change in the ESR spectrum of the SiO$_2$ glass material obtained in this comparative example is shown in FIG. 5(a) and the change in concentration centered on the paramagnetic coloration estimated on the integral area of spectrum is shown in FIG. 5(b). In FIG. 5(b), the vertical axis represents spin concentration/cm$^{-2}$ and the horizontal axis depth from the surface of the substrate.

In FIG. 5(a), the curves 12, 13, and 14 represent the ethel thicknesses (μm) and the symbols a and b respectively represent excess oxygen defect and the insufficient oxygen defect.

Figure 5:
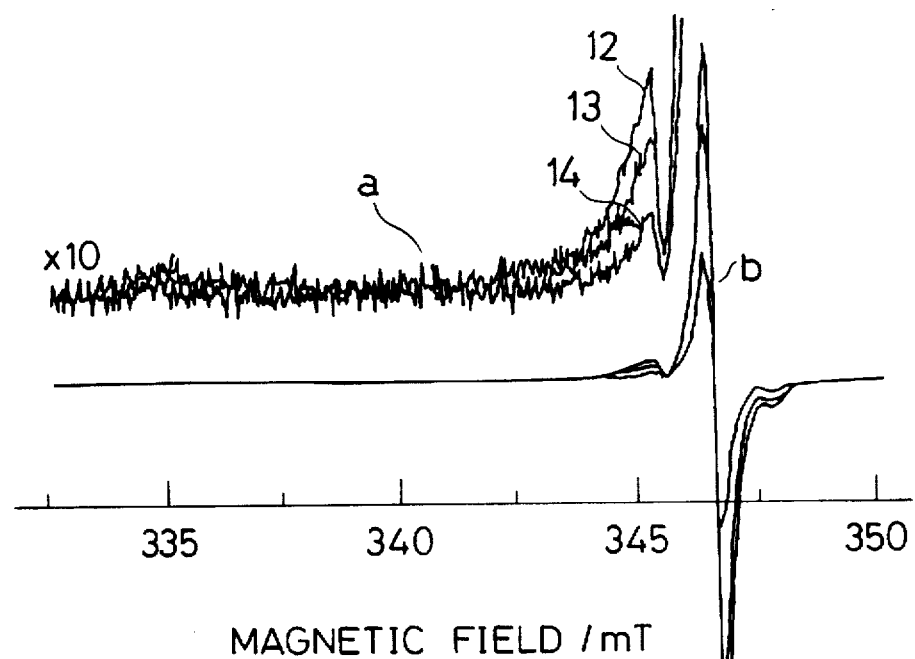
FIG. 5(a) is a graph showing changes in the ESR spectrum of a $SiO_2$ glass material obtained in Comparative Example 1.
FIG. 5(b) is a graph showing changes in density centering on paramagnetic coloration estimated from the integrated area of the ESR spectrum of a $SiO_2$ glass material obtained in Comparative Example 1.
Figure 5:
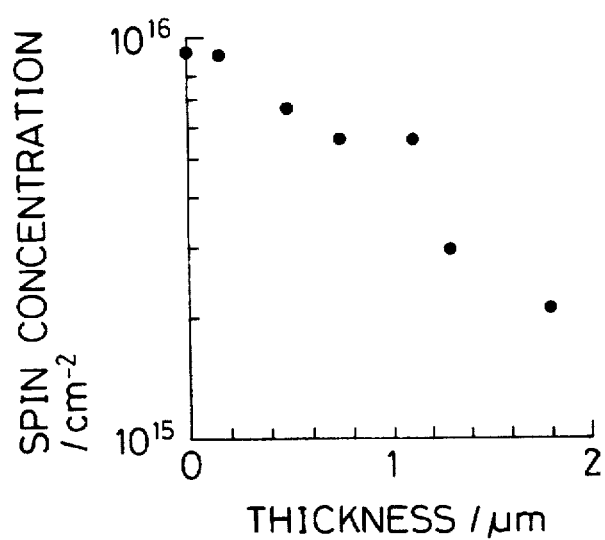

The data of FIG. 5 indicate that the change in absorption due to the change in electron spin resonance spectrum occurred not only in the implantation layer but also in the damaged layer.

The phenomena described above occurred only when the temperature of the heat treatment was less than 300° C.

COMPARATIVE EXAMPLE 2

A SiO$_2$ glass implanted with Ge ions at $2\times10^{19}$ ions/cm$^3$ by the procedure of Example 1 was heat-treated at 500° C. for 15 hours and then exposed to $10^4$ pulses of an ArF laser beam (300 mJ/cm$^2$). These treatments brought about absolutely no change in transmission spectrum.

What is claimed is:

1. A method for the production of a SiO$_2$ glass material comprising:

a surface; and a region having a changed index of refraction, said region being between about 1 µm from the surface and about 2 µm from the surface, which consists essentially of implanting at least $5\times10^{19}$ Ge ions/cm$^3$ into a SiO$_2$ glass material by an ion implantation technique, heat-treating the Ge ion-implanted SiO$_2$ substrate at a temperature of at least 300° C., and exposing the heat-treated substrate to an ultraviolet light.

2. The method according to claim 1, wherein the amount of ions implanted is at least $1\times10^{20}$ ions/cm$^3$.

3. The method according to claim 1, wherein said heat treatment is carried out at a temperature in the range of 300° to 1000° C. for a period of at least three hours.

4. The method according to claim 1, wherein said ultraviolet light has a wavelength of not more than 300 nm and an energy density of at least 5 mJ/cm$^2$.

5. A SO$_2$ glass material comprising:

a surface; and a region having a changed index of refraction, said region being between about 1 µm from the surface and about 2 nm from the surface, wherein the SiO$_2$ glass material is obtained by a method which consists essentially of implanting at least $5\times10^{19}$ Ge ions/cm$^3$ to a SiO$_2$ glass substrate by an ion implantation technique, heat-treating the Ge ion-implanted SiO$_2$ substrate at a temperature of at least 300° C., and exposing the heat-treated substrate to an ultraviolet light.

6. The SiO$_2$ glass material according to claim 5, wherein the amount of ions implanted is at least $1\times10^{20}$ ions/cm$^3$.

7. The SiO$_2$ glass material according to claim 5, wherein said heat treatment is carried out at a temperature in the range of 300° to 1000° C. for a period of at least three hours.

8. The SiO$_2$ glass material according to claim 5, wherein said ultraviolet light has a wavelength of not more than 300 nm and an energy density of at least 5 mJ/cm$^2$.

9. The SiO$_2$ glass material according to claim 5, wherein the amount of ions implanted is between $5\times10^{19}$ and $1\times10^{21}$ Ge ions/cm$^3$.

* * * * *